US009652769B1

(12) United States Patent
Golin

(10) Patent No.: US 9,652,769 B1
(45) Date of Patent: May 16, 2017

(54) METHODS, APPARATUS AND SYSTEMS FOR SECURELY STORING AND/OR ACCESSING PAYMENT INFORMATION OR OTHER SENSITIVE INFORMATION BASED ON TOKENS

(71) Applicant: Carbonite, Inc., Boston, MA (US)

(72) Inventor: Eric J. Golin, Newton, MA (US)

(73) Assignee: Carbonite, Inc., Boston, MA (US)

( * ) Notice: Subject to any disclaimer, the term of this patent is extended or adjusted under 35 U.S.C. 154(b) by 736 days.

(21) Appl. No.: 13/671,178

(22) Filed: Nov. 7, 2012

Related U.S. Application Data

(62) Division of application No. 12/956,999, filed on Nov. 30, 2010.

(51) Int. Cl.
*G06Q 20/00* (2012.01)
*G06Q 20/38* (2012.01)

(52) U.S. Cl.
CPC ......... *G06Q 20/385* (2013.01); *G06Q 20/382* (2013.01); *G06Q 20/383* (2013.01); *G06Q 20/3829* (2013.01)

(58) Field of Classification Search
CPC .................. G06Q 20/385; G06Q 20/3829
USPC ............................................ 705/64; 713/193
See application file for complete search history.

(56) References Cited

U.S. PATENT DOCUMENTS 4,918,593 A * 4/1990 Huber
5,892,900 A * 4/1999 Ginter et al. ................... 726/26
6,327,578 B1 12/2001 Linehan
6,507,846 B1 * 1/2003 Consens
7,422,115 B2 * 9/2008 Zager et al. .................. 209/206
2007/0169189 A1 * 7/2007 Crespo ................ G06F 21/6227
726/20
2008/0040276 A1 2/2008 Hammad et al.
2008/0077806 A1 3/2008 Cui et al.
2008/0175391 A1 7/2008 Finkelstein et al.
2008/0208697 A1 8/2008 Kargman et al.
(Continued)

OTHER PUBLICATIONS

White et al., "How Computers Work", Oct. 15, 2003, Que, 7th Edition.*
(Continued)

*Primary Examiner* — Steven Kim
(74) *Attorney, Agent, or Firm* — Foley & Lardner LLP; John D. Lanza; Daniel Rose

(57) ABSTRACT

A token is generated and processed as a substitute for sensitive information, e.g., payment information associated with a customer making a purchase of a product/service from a vendor. The customer's payment information is encrypted and stored in a first memory record of a secure computer system. A token is generated that includes memory-related information identifying the first memory record, and the token is transmitted to the vendor for storage in a customer record. To facilitate payment for the purchase, the vendor transmits the token to another party (e.g., a billing service or payment processor), and the encrypted payment information is read from the first memory record of the secure computer system based on the memory-related information in the token. The encrypted payment information is then decrypted to recover the payment information which is then used to effect payment.

8 Claims, 9 Drawing Sheets

(56) References Cited

U.S. PATENT DOCUMENTS

| | | | |
|---|---|---|---|
| 2008/0283590 A1* | 11/2008 | Oder, II | G06Q 20/20 235/380 |
| 2009/0076950 A1 | 3/2009 | Chang et al. | |
| 2009/0249082 A1 | 10/2009 | Mattsson | |
| 2010/0070754 A1* | 3/2010 | Leach | 713/152 |
| 2010/0145860 A1 | 6/2010 | Pelegero | |
| 2010/0185545 A1* | 7/2010 | Royyuru et al. | 705/67 |
| 2010/0219994 A1 | 9/2010 | Palmer et al. | |
| 2010/0257612 A1 | 10/2010 | McGuire et al. | |
| 2011/0078779 A1 | 3/2011 | Liu et al. | |
| 2011/0154467 A1 | 6/2011 | Bomar et al. | |
| 2012/0144376 A1 | 6/2012 | Van Eijndhoven et al. | |

OTHER PUBLICATIONS

Office Action on U.S. Appl. No. 12/956,999 dated Oct. 15, 2012.
Office Action on U.S. Appl. No. 12/956,999 dated Apr. 15, 2013.
Office Action on U.S. Appl. No. 12/956,999 dated Nov. 20, 2015.

\* cited by examiner

"1 : hhhhhhhh : xxxxxxxxx*"

FIG. 8

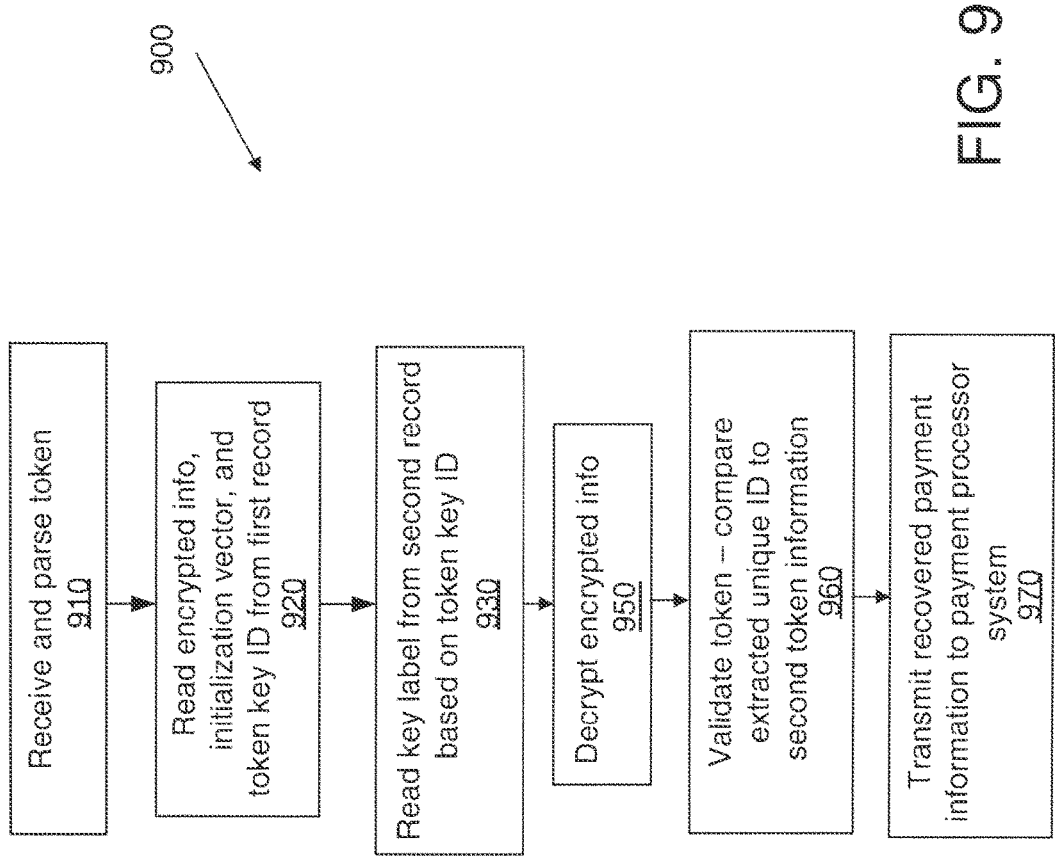

METHODS, APPARATUS AND SYSTEMS FOR SECURELY STORING AND/OR ACCESSING PAYMENT INFORMATION OR OTHER SENSITIVE INFORMATION BASED ON TOKENS

BACKGROUND

The "Payment Card Industry" (PCI) relates to the use of cards (e.g., debit cards, credit cards, prepaid cards, ATM cards, etc.) as substitutes for currency. Such cards often are used by cardholders for depositing and withdrawing funds from bank accounts, moving funds amongst accounts, as well as for purchases of products and/or services from vendors.

The Payment Card Industry Data Security Standard (PCI-DSS) is an information security standard designed to mitigate fraudulent use of PCI cards by imposing greater control over transmission and storage of cardholder data (e.g., primary account number or PAN, card validation code(s), personal identification number or PIN associated with a card). Exemplary elements of PCI-DSS include protecting and restricting access to stored cardholder data, tracking and monitoring all access to network resources and cardholder data, encrypting transmission of cardholder data across open or public networks, use and regular update of anti-virus software, installation and maintenance of a firewall configuration to protect cardholder data and, particularly in purchase and sale environments, avoiding vendor-supplied defaults for system passwords and other security parameters. Accordingly, PCI-DSS conventionally requires security protocols, including data encryption, to safeguard sensitive information associated with a PCI card and its holder.

Notwithstanding the various requirements of PCI-DSS, this standard does not necessarily provide for infallible data security; in particular, a system that handles information associated with a cardholder may nonetheless be vulnerable in some respects to breach even if deemed to be PCI-compliant. Moreover, PCI-DSS requirements may in some cases be burdensome, expensive to implement, and confusing to comply with due to subjective interpretations and enforcement. Additionally, compliance validation is required only for some types of vendors and may be optional for others (e.g., depending on the card brand).

"Tokenization" is the process of replacing sensitive information with a surrogate or "token" that is not considered to be sensitive and that masks the sensitive information that it replaces. Tokenization techniques can be employed with various types of sensitive information (e.g., payment information such as PCI card information/cardholder data, bank transactions, medical records, criminal records, vehicle driver information, loan applications, stock trading and voter registration, etc.). In the PCI environment, tokens conventionally are used to reference cardholder data that is stored in a database or computer system (e.g., a "tokenization system") different than the database or computer system used by a merchant/vendor to store various information relating to customers and/or purchase transactions. Accordingly, tokenization has been employed to increase the security of electronic transactions, mitigate theft of cardholder data in storage, and facilitate merchant/vendor system compliance with PCI-DSS; in particular, tokens, rather than cardholder data, are stored in the merchant/vendor system.

Tokens may be formatted in a variety of ways. Some conventional tokenization systems generate tokens so as to match the format of the original sensitive data. For example, a token for PCI card information/cardholder data (hereafter "payment information") may have a same length as the PAN, and may contain elements of the original PAN (e.g., the last four digits of the PAN). The token also may include alpha-numeric characters that represent miscellaneous cardholder information and/or data specific to a particular purchase transaction.

When an authorization request is made (e.g., by a vendor to a payment system) to verify the legitimacy of a card used for a purchase transaction (and an available credit limit, if applicable), typically the actual payment information is used only in the initial authorization request, together with transaction details (e.g., purchase price). Pursuant to a conventional authorization and tokenization process, if an authorization request is approved, a token is returned to the requester (e.g., the vendor) instead of the payment information, and the payment information is encrypted and securely stored in the tokenization system. The token, instead of the payment information, is stored in the vendor's system in a customer record associated with the cardholder. Accordingly, a breach of the vendor's system does not expose the actual payment information to fraudulent use; more specifically, the token itself, if stolen, cannot be used for transactions or fraudulent charges. Once the vendor has received and stored the token, the vendor may use the token to authorize subsequent purchase transactions by the cardholder.

SUMMARY

While conventional tokenization techniques provide a resource for facilitating compliance with PCI-DSS, the inventor has appreciated that presently there are no standards for tokenization and no consensus as to a sound methodology for generating and processing tokens for PCI cards or other sensitive information.

Amongst major PCI participants, to date Visa is the only entity that has outlined recommendations for tokenization in their publication "Best Practices for Tokenization Version 1.0" (see http://usa.visa.com/download/merchants/tokenization_best_practices.pdf, Jul. 14, 2010, hereby incorporated by reference in its entirety, and hereafter referred to as "Visa Best Practices"). The Visa Best Practices generally recommends the use of tokens to replace PANs for use in payment-related and ancillary business functions, and notes that tokenization allows merchants/vendors to limit the storage of cardholder data to within a dedicated tokenization system, thereby potentially simplifying PCI-DSS compliance in connection with a merchant/vendor data base of customer information. While the Visa Best Practices provide some guidance as to the implementation of tokenization systems, it does not however constitute a widely adopted standardization of best practices.

The Visa Best Practices notes that the degree of security that a token provides relies on properties of uniqueness and the inability to determine the original PAN based only on information contained in the token. To this end, the Visa Best Practices outlines four recommendations for secure implementation of a tokenization system, namely: 1) token generation, in which recovery of the original PAN is not computationally feasible based only on the token; 2) token mapping, in which a PAN is not returned to, or accessible by, a merchant/vendor, 3) PCI-DSS compliant tokenization systems, in which encrypted PANs are stored, and 4) minimum requirements for encryption keys used to encrypt PANs. Particularly in connection with token generation, the Visa Best Practices specifies that tokens should be generated utilizing either a known strong cryptographic algorithm with a secure mode of operation and padding mechanism, or a one-way irreversible function (e.g., as a sequence number using a hash function with random bits, or as a randomly generated number). More specifically, for multi-use tokens, the Visa Best Practices recommends generating a token based on hashing of the cardholder data using a fixed but unique "salt" (random bits serving as inputs to the hash) per vendor, wherein the salt has a minimum length of 64-bits. Other commentators on tokenization, including purported security experts, have agreed that the only way to guarantee that a PAN cannot be computationally recovered from a token is if the token is randomly generated (see http://www.darkreading.com/taxonomy/index/printarticle/id/227100131).

Unlike other conventional tokenization techniques which may include truncated PAN data as part of a token (e.g., the last four digits of the PAN), the Visa Best Practices emphasizes that truncated PAN data must not be stored or transmitted in conjunction with a token. Accordingly, as noted above, there is no consensus as to sound methodology for token generation, as the Visa Best Practices is in contrast with some other conventional tokenization techniques.

In contrast to the Visa Best Practices and other conventional tokenization techniques, the inventor has recognized and appreciated that robust tokens may be generated without necessarily employing encryption algorithms or random numbers to provide information in the tokens. For example, given that a suitably secure tokenization system employs a strong data encryption system to ensure PCI-DSS compliance, a variety of memory attributes of the tokenization system itself, such as pointers or addresses to particular memory locations at which information associated with the token is stored, or labels for database entries or tables in which information associated with token is stored, may be employed as one or more constituent elements of a token.

In view of the foregoing, various inventive embodiments disclosed herein relate to methods, apparatus and systems for securely storing and/or accessing payment information or other sensitive information based on tokens, in which tokens are not necessarily generated based on encryption algorithms or random numbers, but are instead generated based at least in part on memory attributes of a sufficiently secure (e.g., PCI-compliant) tokenization system.

In various aspects of exemplary inventive embodiments, a token is generated and processed as a substitute for sensitive information, e.g., payment information associated with a customer making a purchase of a product/service from a vendor. For example, upon receiving a request for a purchase from a customer, a vendor may direct the customer to a billing service to which the customer provides payment information—in this manner, the vendor itself is not in possession of the payment information. The billing service in turn passes the payment information to (or itself operates and maintains) a tokenization system that facilitates encryption of the payment information and securely stores encrypted payment information in a first memory record of the tokenization system. The tokenization system generates a token that includes memory-related information identifying the first memory record in which the encrypted payment information is stored, and the token is transmitted to the vendor for storage (e.g., in a customer record of the vendor's computer system) in lieu of the payment information.

In exemplary implementations, to facilitate payment for the purchase, the vendor transmits the token to another party (e.g., the billing service or another payment processor) that in turn passes the token to the tokenization system. Based on the memory-related information in the token, the tokenization system reads the encrypted payment information from the first memory record. The encrypted payment information is then decrypted to recover the payment information, which is then passed by the tokenization system to a billing system/payment processor to effect payment.

In yet other aspects of exemplary embodiments, a token generated and processed by a tokenization system may include additional information that facilitates verification of a token's validity (e.g., integrity, authenticity or "freshness") when processing the token to recover payment information. For example, in one exemplary implementation, the additional information in the token may include a unique identifier such as a time stamp, which may be associated with one or more of receipt of the payment information by the tokenization system, encryption of the payment information, and/or generation of the token. The unique identifier also may stored in the first memory record of the tokenization system together with the encrypted payment information, and/or constitute a portion of the payment information that is encrypted. Upon receipt of a token to facilitate payment processing, the tokenization system may verify the validity of the token by reading the unique identifier from the first memory record and comparing it to the additional information constituting a portion of the token, and/or decrypting the encrypted information, extracting the unique identifier, and then comparing it to the additional information in the token representing same.

In sum, one embodiment of the present invention is directed to a computer-implemented method. performed in a first computer system comprising at least one processor, at least one memory, and at least one communications interface, for generating a token as a substitute for sensitive electronic information so as to provide secure access and storage for the sensitive electronic information. The method comprises: A) receiving the sensitive electronic information via the at least one communications interface; B) facilitating encryption, via the at least one processor, of at least some of the sensitive electronic information so as to generate encrypted sensitive information; C) storing the encrypted sensitive information in a first record of the at least one memory; D) generating the token, wherein the token includes first token information identifying the first record of the at least one memory in which the encrypted sensitive information is stored; and E) transmitting, via the at least one communication interface, the token to at least one second computer system different than the first computer system to facilitate subsequent recovery of the sensitive electronic information.

Another embodiment is directed to a computer-implemented method, performed in a system comprising at least one processor, at least one memory, and at least one communications interface, for generating a token as a substitute for payment information relating to a purchase of a product and/or service from a vendor. The method comprises: A) receiving the payment information via the at least one communications interface; B) facilitating encryption, via the at least one processor, of at least some of the payment information so as to generate encrypted payment information; C) storing the encrypted payment information in a first record of the at least one memory; D) generating the token, wherein the token includes first token information identifying the first record of the at least one memory in which the encrypted payment information is stored; and E) transmitting, via the at least one communication interface, the token to the vendor.

Another embodiment is directed to an apparatus for generating a token as a substitute for payment information relating to a purchase of a product and/or service from a vendor. The apparatus comprises: at least one communications interface; at least one memory to store processor-executable instructions; and at least one processor communicatively coupled to the at least one communications interface and the at least one memory, wherein upon execution of the processor-executable instructions, the at least one processor: A) controls the at least one communications interface so as to receive the payment information; B) facilitates encryption of at least some of the payment information so as to generate encrypted payment information; C) controls the at least one memory so as to store the encrypted payment information in a first record of the at least one memory; D) generates the token, wherein the token includes first token information identifying the first record of the at least one memory in which the encrypted payment information is stored; and E) controls the at least one communications interface so as to transmit the token to the vendor.

Another embodiment is directed to at least one non-transitory computer readable storage medium encoded with processor-executable instructions that, when executed by at least one processor, perform a method for generating a token as a substitute for payment information relating to a purchase of a product and/or service from a vendor, the method comprising: A) receiving the payment information; B) facilitating encryption of at least some of the payment information so as to generate encrypted payment information; C) storing the encrypted payment information in a first record of memory; D) generating the token, wherein the token includes first token information identifying the first record in which the encrypted payment information is stored; and E) transmitting the token to the vendor.

Another embodiment is directed to a computer-implemented method, performed in a system comprising at least one processor, at least one memory, and at least one communications interface, for generating a token as a substitute for payment information relating to a purchase of a product and/or service from a vendor. The method comprises: A) receiving the payment information, via the at least one communications interface, from a billing service acting as a billing agent of the vendor; B) generating the token, wherein the token includes: first token information identifying a first record of the at least one memory; and second token information representing a unique timestamp for the received payment information and/or generation of the token; C) facilitating encryption, via the at least one processor, of at least some of the payment information and the unique timestamp using a first key that uniquely corresponds to the token so as to generate encrypted payment information; D) storing in the first record of the at least one memory the encrypted payment information, the unique timestamp, and a token key identifier that identifies a second record of the at least one memory, different from the first record, in which key information relating to the first key is stored; E) storing in the second record of the at least one memory, as part of the key information, a key label that identifies the first key; and G) transmitting, via the at least one communication interface, the token to the vendor.

Another embodiment is directed to a computer-implemented method, performed in a first computer system comprising at least one processor, at least one memory, and at least one communications interface, for processing a token serving as a substitute for payment information relating to a purchase of a product and/or service from a vendor so as to recover the payment information to facilitate payment for the purchase. The method comprises: A) receiving the token via the at least one communications interface, wherein the token includes first token information identifying a first record of the at least one memory in which encrypted payment information is stored; B) reading the encrypted payment information from the first record, based on the first token information, to facilitating decryption of the encrypted payment information so as to recover the payment information; and C) transmitting, via the at least one communication interface, the recovered payment information to a second computer system different than the first computer system to facilitate the payment for the purchase of the product and/or service from the vendor. In various aspects, the token further includes second token information representing at least one unique identifier for the payment information and/or the token, the at least one unique identifier is stored in the first record of the at least one memory, and the method further comprises: D) comparing the second token information to the at least one unique identifier stored in the first record of the memory so as to verify a validity (e.g., integrity, authenticity, freshness) of the token.

Another embodiment is directed to a computer-implemented method, performed in a first computer system comprising at least one processor, at least one memory, and at least one communications interface, for maintaining and using a token as a substitute for customer payment information relating to a purchase of a product and/or service by a customer from a vendor that operates the first computer system. The method comprises: A) receiving, via the at least one communications interface, a request from the customer for the purchase of the product and/or service; B) directing the customer, via the at least one communication interface, to a second computer system, different from the first computer system, to provide the customer payment information to the second computer system; C) receiving the token, via the at least one communications interface, from the second computer system or a third computer system different than the first computer system and the second computer system; D) storing the token in a customer record of the at least one memory, the customer record including customer information associated with the customer; and E) transmitting the token, via the at least one communication interface, to the second computer system or the third computer system to facilitate payment for the purchase of the product and/or service by the customer. In one aspect, the token includes first token information identifying a first memory record in the second computer system or the third computer system in which encrypted customer payment information is stored. In another aspect, the token further includes second token information representing at least one unique identifier for the token so as to facilitate verification of a validity of the token by the second computer system or the third computer system.

Another embodiment is directed to a computer-implemented method, performed in a first computer system comprising at least one processor, at least one memory, and at least one communications interface, for facilitating payment for a purchase of a product and/or service based on a token as a substitute for customer payment information relating to a customer making the purchase of the product and/or service. The method comprises: A) receiving, via the at least one communications interface, the token from a second computer system, different than the first computer system, wherein the token includes: first token information identifying a first memory record not in the second computer system in which encrypted customer payment information is stored; and second token information representing at least one unique identifier for the token; B) facilitating verification of the token, via the at least one processor, based at least in part on the second token information; C) facilitating decryption of the encrypted customer payment information, via the at least one processor, based at least in part on the first token information so as to provide recovered customer payment information; and D) facilitating payment for the purchase of the product and/or service, via the at least one processor, based on the recovered customer payment information.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

Various embodiments taught herein are illustrated by way of example, and not by way of limitation, in the figures of the accompanying drawings, in which:

FIG. 8 illustrates an exemplary format for a token generated by the tokenization system of FIG. 1 and FIG. 7, according to one embodiment of the present invention; and FIG. 9 is a flow diagram illustrating a method, employed by the tokenization system of FIG. 1 and FIG. 7, for processing a token and facilitating decryption of sensitive information corresponding to the token, according to one embodiment of the present invention.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION

Following below are more detailed descriptions of various concepts related to, and embodiments of, inventive methods, apparatus and systems for securely storing and/or accessing payment information or other sensitive information based on tokens. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
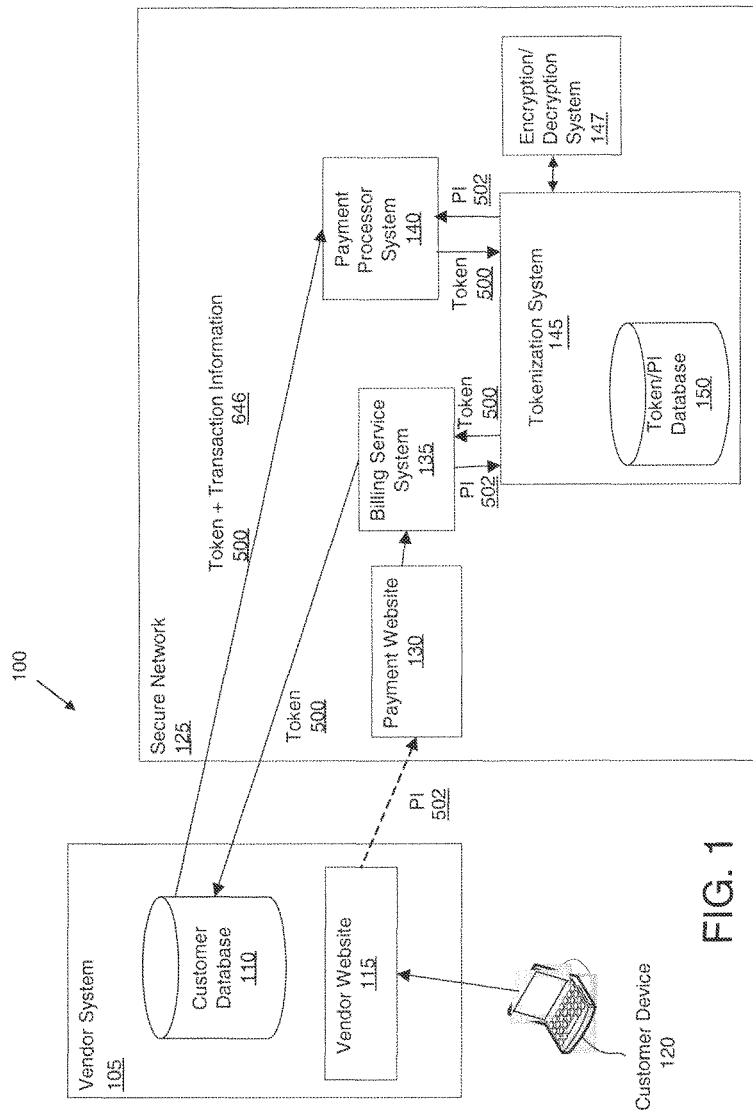
FIG. 1 is a block diagram illustrating an exemplary system for handling sensitive information, according to one embodiment of the present invention.

FIG. 1 illustrates an exemplary system 100 for handling sensitive information, such as information associated with a PCI card (e.g., a debit card, a credit card, a prepaid card, an ATM card, etc.). While the exemplary system 100 is discussed in greater detail below as handling information associated with a PCI card for purposes of illustration, it should be appreciated that the concepts disclosed herein are not limited in this respect, and may apply more generally to various types of sensitive information. In particular, "sensitive information" as contemplated herein may relate to any information pertaining to a given entity (e.g., a person; a public or private company, organization, institution; a government or military entity, etc.) that may economically or legally compromise the entity if discovered and/or misused by another. Accordingly, examples of "sensitive information" include, but are not limited to, PCI card information/cardholder data, banking records, medical records, criminal records, vehicle driver information, loan applications, stock trading and voter registration, employee information, student information, and the like.

In the exemplary context of information associated with a PCI card, for purposes of the present disclosure "payment information" refers to any information associated with a PCI card, examples of which may include, but are not limited to, a primary account number (PAN), an expiration date, a cardholder name, one or more card validation codes, and a personal identification number or PIN associated with a card. In some instances, transaction-specific information (e.g., price information relating to a purchase of a product and/or service) may constitute at least a portion of payment information; however, as discussed further below, it should be appreciated that in some contexts, payment information may purposefully exclude transaction-specific information (e.g., purchase price), so that the payment information (e.g., PAN) may be securely stored and substituted by a token, which token then may be transmitted together with transaction-specific information relating to price to facilitate payment.

Various elements of the system 100 facilitate secure storage and access of sensitive information, such as payment information, based on tokens. In particular, as set forth in greater detail below, via various elements of the system 100, a token is generated and processed as a substitute for sensitive information. Such a token may be stored in lieu of the sensitive information in a less-secure portion of the system, while the sensitive information itself (or an encrypted version of the sensitive information) is stored in a more-secure portion of the system.

To this end, the system 100 may include multiple constituent portions or sub-systems that may maintain different levels of data security in connection with data stored in the respective portions/sub-systems. For example, in one embodiment, the system 100 includes a vendor system 105 that is maintained/operated by a vendor of products and/or services (e.g., for purchase via the Internet). The system 100 also includes a secure network 125 that facilitates billing and payment for purchase transactions between the vendor and one or more customers. In one aspect of this embodiment, the secure network 125 and various elements therein may be configured as a network that complies with PCI-DSS, so as to ensure secure storage and/or transmission of sensitive information such as payment information. In another aspect, the vendor system 105 may not handle sensitive information but instead may handle tokens as substitutes for same; as such, the vendor system 105 need not necessarily be configured as a secure system (e.g., one that meets or exceeds requirements to comply with PCI-DSS), thereby mitigating at least some of the cost and/or complexity of implementation (e.g., design, operation and maintenance) by the vendor of the vendor system.

The respective sub-systems of the system 100 may communicate with other one or more other sub-systems of the system 100, or other computer systems, via one or more wired or wireless communication networks such as an Internet Protocol (IP) network, a local area network (LAN), a wide area network, the Internet, etc. In particular, communications to and from the secure network 125 may by implemented using Hypertext Transfer Protocol Secure (https) to provide encrypted communication and secure identification of elements within the secure network 125.

As shown in FIG. 1, in one embodiment the vendor system 105 may be accessed via a vendor website 115 by customers using a customer device 120 (e.g., various types of computers, telecommunications devices, personal digital assistants, smart phones, etc.). The vendor system 105 also includes a customer database 110 of information generally associated with customers and purchase transactions; in particular, amongst other customer-related information, the customer database 110 stores tokens 500 and transaction information 646 associated with customers and purchase transactions (FIG. 4, discussed in greater detail below, illustrates exemplary contents of the customer database 110). Any of a wide variety of vendors of products/services operating/maintaining the vendor system 105 are contemplated in various embodiments of the present invention. In one exemplary implementation, the vendor may provide remote data backup and/or data access services to customers, and the vendor system 105 may facilitate purchases of such services.

The secure network 125 of the system 100 may include a billing service system 135 (e.g., that may be accessed via a payment website 130), a payment processor system 140, a tokenization system 145, and a data encryption/decryption system 147. While any of these sub-systems of the secure network 125 may include some type of memory/data storage, the tokenization system 145 particularly includes a token/payment information (PI) database 150 in which sensitive information, such as payment information (e.g., encrypted payment information), as well as information relating to tokens, is stored.

Although the billing service system 135, the payment processor system 140, the tokenization system 145 and the encryption/decryption system 147 are shown separately in the system of FIG. 1 as constituent sub-systems of the secure network 125, as discussed further below it should be appreciated that one or more of these respective sub-systems within the secure network 125 may be operated/maintained by different entities or the same entity. Likewise, the respective functionalities of these sub-systems may be combined in some manner in a given computer system; these sub-systems are illustrated individually in FIG. 1 primarily to facilitate discussion of their respective functionalities, but not because they need necessarily be operated/maintained as individual sub-systems/computer systems. Furthermore, while each of the billing service system 135, the payment processor system 140, the tokenization system 145 and the encryption/decryption system 147 are shown as constituent sub-systems of the same secure network 125 shown in FIG. 1, it should be appreciated that in other embodiments, not all of these constituent sub-systems need necessarily be part of the same secure network 125; rather, one or more of these constituent sub-systems may be part of respective different secure networks that communicate with each other in some fashion (e.g., via https).

Figure 2:
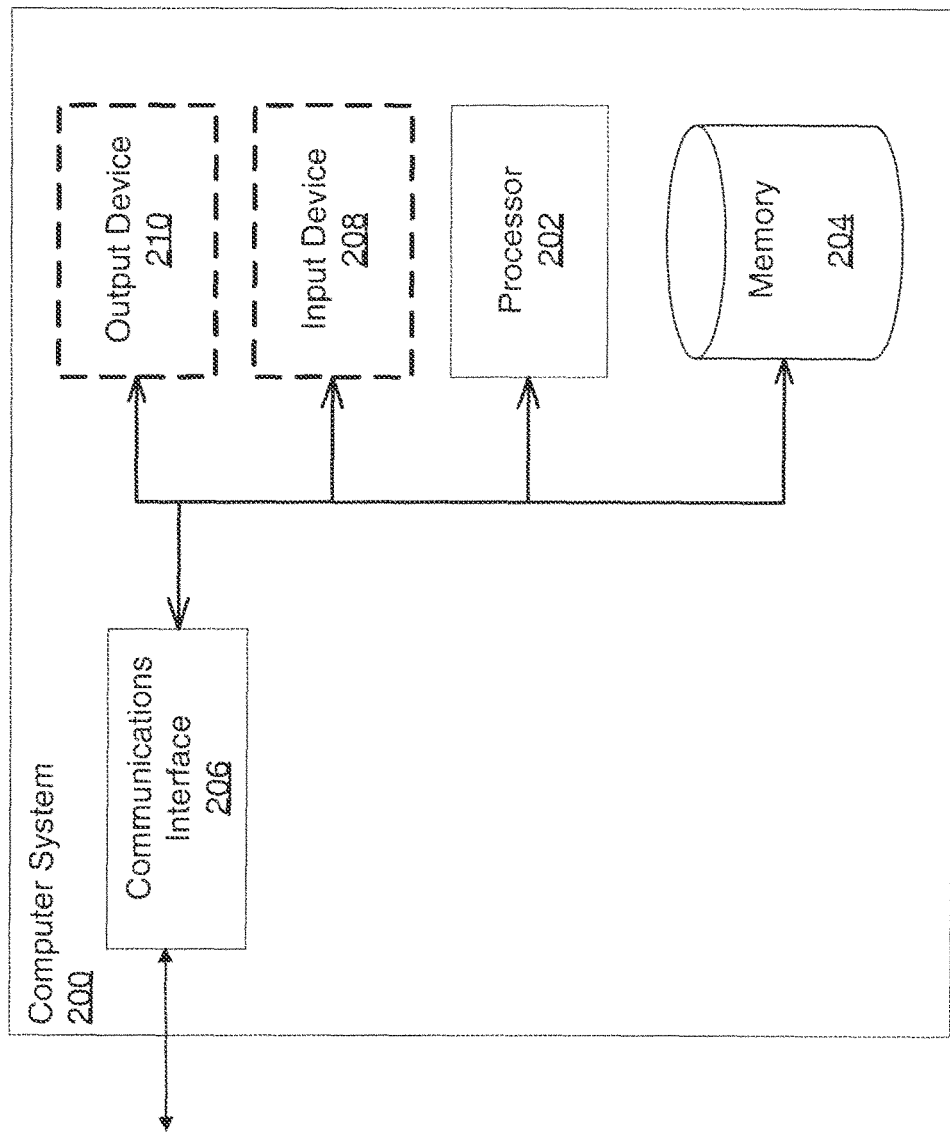
FIG. 2 is a block diagram illustrating a general architecture for a computer system that may be employed to implement various elements (e.g., sub-systems) of the system shown in FIG. 1, according to one embodiment of the present invention.

FIG. 2 shows the general architecture of an illustrative computer system 200 that may be employed to implement any of the computer systems discussed herein (including one or more of the vendor system 105, the billing service system 135, the payment processor system 140, the tokenization system 145, and the encryption/decryption system 147 shown in FIG. 1) in accordance with some embodiments. The computer system 200 of FIG. 2 comprises one or more processors 202 communicatively coupled to memory 204, one or more communications interfaces 206, and optionally one or more output devices 210 (e.g., one or more display units) and one or more input devices 208.

In the computer system 200 of FIG. 2, the memory 204 may comprise any computer-readable storage media, and may store computer instructions (also referred to herein as "processor-executable instructions") for implementing the various functionalities described herein for respective systems, as well as any data relating thereto, generated thereby, and/or received via the communications interface(s) or input device(s) (if present). Referring again to the system 100 of FIG. 1, examples of the memory 204 include the customer database 110 of the vendor system 105 and the token/PI database 150 of the tokenization system 145. The processor(s) 202 shown in FIG. 2 may be used to execute instructions stored in the memory 204 and, in so doing, also may read from or write to the memory various information processed and or generated pursuant to execution of the instructions.

The processor 202 of the computer system 200 shown in FIG. 2 also may be communicatively coupled to and/or control the communication interface(s) 206 to transmit and/or receive various information pursuant to execution of instructions. In particular, the communications interface(s) 206 may be coupled to a wired or wireless network, bus, or other communication means and may therefore allow the computer system 200 to transmit information to and/or receive information from other devices (e.g., other computer systems). While not shown explicitly in the system of FIG. 1, one or more communications interfaces facilitate information flow between the vendor system 105 and various elements/sub-systems of the secure network 125. In some implementations, the communications interface(s) may be configured (e.g., via various hardware components and/or software components) to provide a website as an access portal to at least some aspects of the computer system 200. In this respect, referring again to the system 100 of FIG. 1, examples of communications interfaces 206 include the vendor website 115 and the payment website 130.

The optional output devices 210 of the computer system 200 shown in FIG. 2 may be provided, for example, to allow various information to be viewed or otherwise perceived in connection with execution of the instructions. The optional input device(s) 208 may be provided, for example, to allow a user to make manual adjustments, make selections, enter data or various other information, and/or interact in any of a variety of manners with the processor during execution of the instructions. Additional information relating to a general computer system architecture that may be employed for various systems discussed herein is provided at the conclusion of this disclosure.

Figure 3:
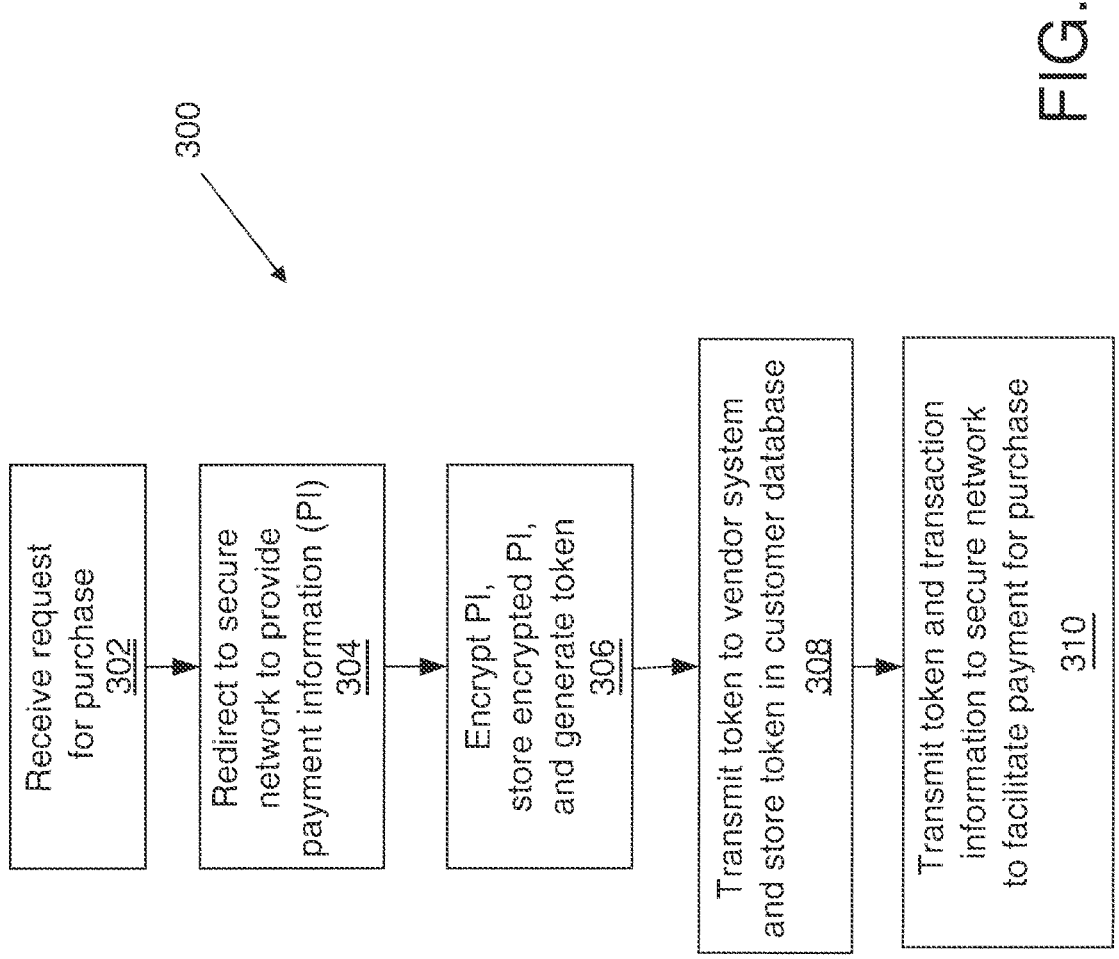
FIG. 3 is a flow chart illustrating a method, according to one embodiment of the present invention, for processing a transaction for the purchase of a product or service by a customer from a vendor that operates/maintains the vendor system shown in FIG. 1.

FIG. 3 provides an overview of a method 300 according to one embodiment for processing a transaction for the purchase of a product or service by a customer from a vendor that operates/maintains the vendor system 105 of FIG. 1. With reference to both FIG. 1 and FIG. 3, in block 302 of the method 300 a request from the customer for the purchase of a product and/or service is received by the vendor system 105 (e.g., via the customer device 120 accessing the vendor website 115). If the customer database 110 of the vendor system 105 does not already include a customer record for the customer containing a token as a substitute for payment information, in block 304 the vendor system 105 may redirect the customer to the secure network 125, so that the customer may provide payment information (PI) 502 to the secure network 125 rather than to the vendor system 105. In particular, the customer may be directed to the payment website 130 of the billing service system 135 to provide the payment information 502.

Within the secure network 125, in block 306 the billing service system 135 in turn provides the payment information 502 to the tokenization system 145 (e.g., via respective communications interfaces). The tokenization system 145 employs the encryption/decryption system 147 to encrypt the payment information, and stores encrypted payment information in the token/PI database 150. The tokenization system 145 also generates a token 500 corresponding to the stored encrypted payment information. As discussed in greater detail below, in one embodiment the token 500 is generated by the tokenization system 145 so as to include memory-related information identifying a memory record in the token/PI database 150 at which the encrypted payment information is stored.

Figure 4:
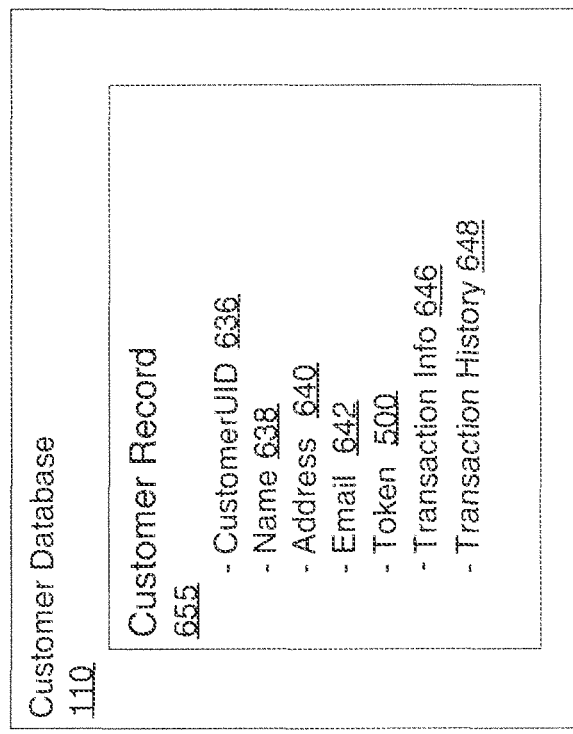
FIG. 4 illustrates an exemplary customer record maintained in the customer database of the vendor system shown in FIG. 1, according to one embodiment of the present invention.

In block 308 of the method 300 shown in FIG. 3, the token 500 is transmitted from the secure network 125 (e.g., via the tokenization system 145 and the billing service system 135) to the vendor system 105 for storage in a customer record of the customer database 110. FIG. 4 illustrates an exemplary customer record 655 of the customer database 110, which record may include (but is not limited to) a customer unique identifier (UID) 636, a customer name 638, an address 640, an email 642, the token 500, specific transaction information 646 (e.g., a purchase price for a product/service) and transaction history information 648.

To facilitate payment for the purchase (and future purchases by the same customer), in block 310 of FIG. 3, the vendor system 105 transmits the token 500 back to the secure network 125, e.g., to the payment processor system 140, along with transaction information 646 (and optionally transaction history information 648). The payment processor system 140 in turn provides the token 500 to the tokenization system 145. As also discussed in detail further below, in one embodiment the tokenization system 145 may extract from the token the memory-related information and reads the encrypted payment information from the appropriate memory record of token/PI database 150 based on the memory-related information in the token. The tokenization system 145 further utilizes the encryption/decryption system 147 to decrypt the encrypted payment information read from the appropriate memory record to recover the payment information 502, which is passed back to the payment processor system 140 to effect payment (e.g., by presenting the recovered payment information 502 together with the transaction information 646). In some implementations also discussed in greater detail below, the tokenization system also may validate the token to ensure its integrity, authenticity and/or freshness before passing recovered payment information to the payment processor system.

Attention now is turned to the functionality of the tokenization system 145 to generate and process tokens, exemplary contents of the token/PI database 150 maintained and used by the tokenization system 145, and exemplary formatting for tokens, according to various embodiments of the present invention.

Figure 5:
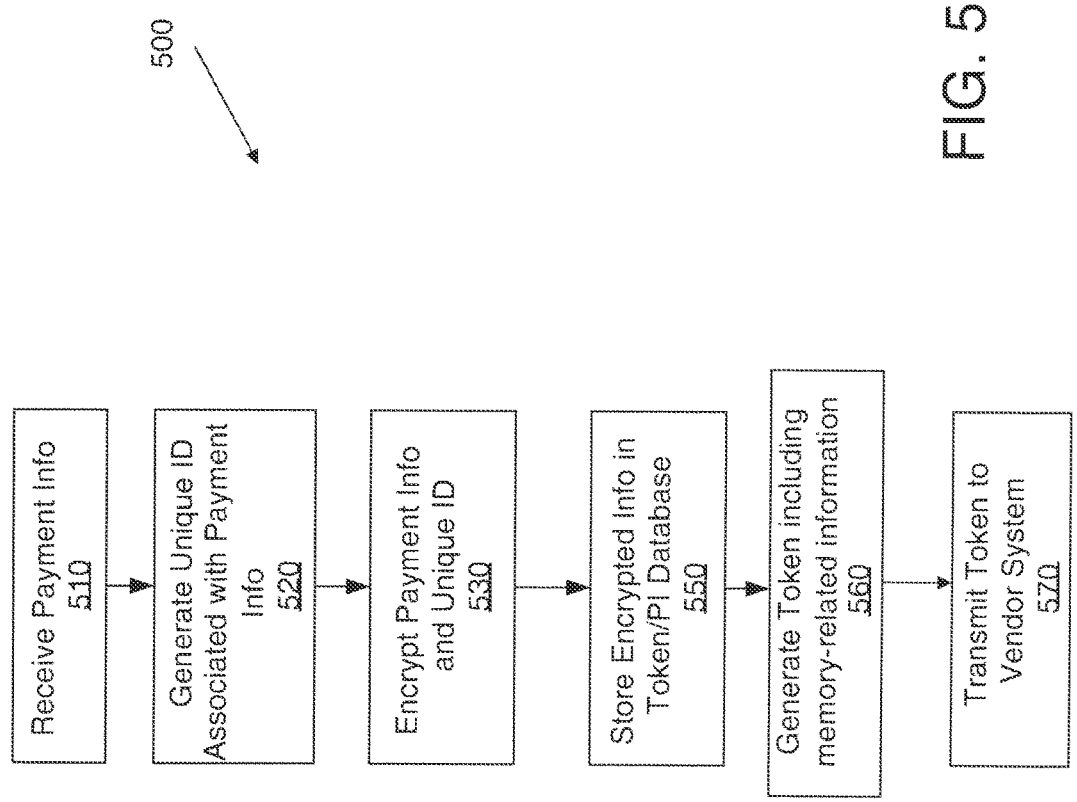
FIG. 5 is a flow diagram illustrating a method, employed by a tokenization system shown in FIG. 1, for facilitating encryption of sensitive information, storing same, and generating a token representing same, according to one embodiment of the present invention.

FIG. 5 is a flow diagram illustrating a method 500 employed by the tokenization system 145 for generating a token, according to one embodiment of the present invention. As introduced above in connection with FIG. 3, and with reference to both FIG. 1 and FIG. 5, in block 510 the tokenization system 145 receives payment information 502 (e.g., from the billing service system 135 acting as a billing agent for the vendor, or in some instances directly from a vendor). In some implementations, as shown in optional block 520, prior to encryption the tokenization system 145 may generate one or more unique identifiers associated with the received payment information 502. For example, in one implementation, the unique identifier may be a time stamp indicating a date and/or time at which the payment information 502 was received by the tokenization system. In implementations in which such a unique identifier is used, as shown in block 530 the tokenization system facilitates encryption (e.g., using the encryption/decryption system 147) of both the payment information together with the unique identifier(s) so as to generate encrypted payment information. As indicated in block 550 of FIG. 5, the tokenization system then stores the encrypted payment information in a first record of the token/PI database 150 (e.g., a table, row of the database, etc.).

In block 560 of FIG. 5, the tokenization system 145 generates the token 500, wherein the token includes first token information (also referred to herein as "memory-related information") identifying the first record of the token/PI database 150 in which the encrypted payment information is stored. In some implementations discussed below, the generated token also may include second token information representing the unique identifier(s) (e.g., time stamp) associated with the payment information and employed in the encryption process. In block 570, the tokenization system 145 transmits the token to the vendor system 105 for storage in the customer database 110.

Figure 6:
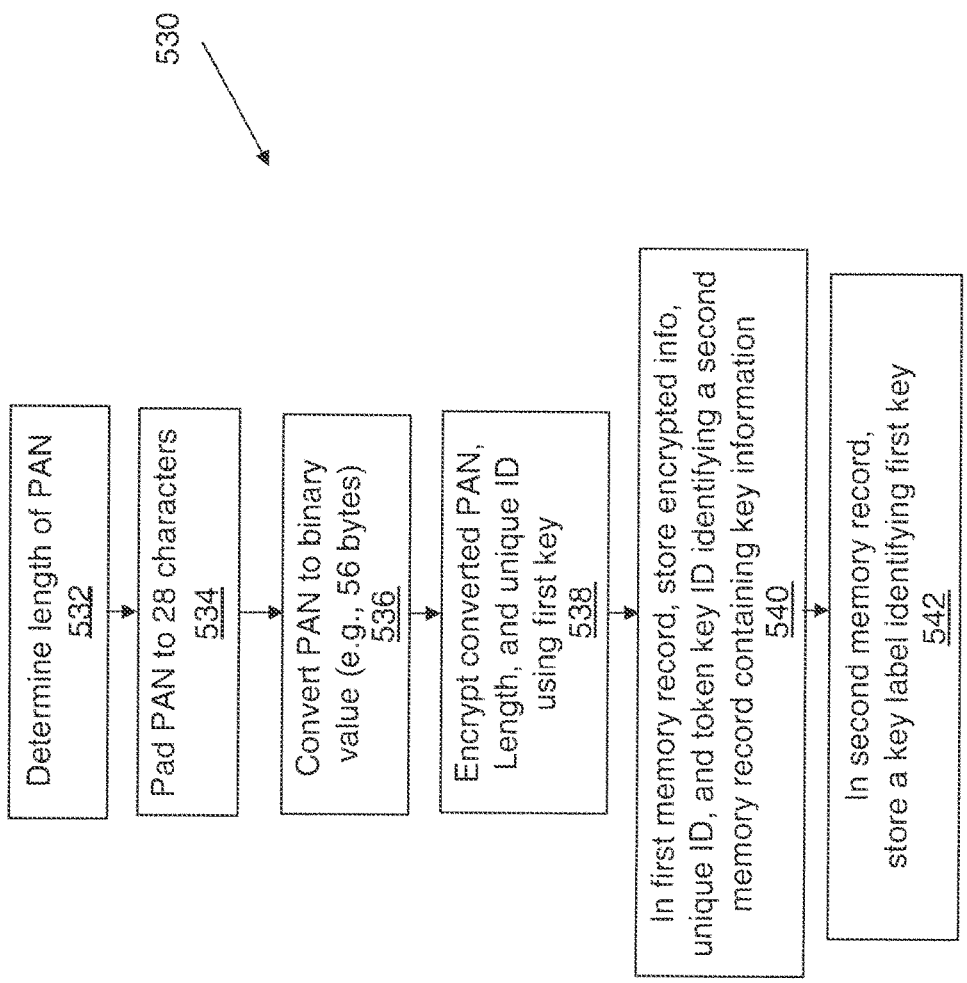
FIG. 6 is a flow chart illustrating details of an encryption and information storage method that may be implemented as part of the method of FIG. 5, according to one embodiment of the present invention.

With respect to encryption, FIG. 6 is a flow chart illustrating details of an exemplary encryption method, including formatting of payment information for encryption and storage in the token/PI database 150 of information relevant to token generation and encryption/decryption, that may be implemented in block 530 of FIG. 5, according to one embodiment of the present invention. In the exemplary method outlined in FIG. 6, at least some of the payment information for encryption includes a primary account number (PAN) of a credit card or other PCI card used to purchase the product and/or service from the vendor.

In block 532 of FIG. 6, a length of the PAN is determined based on a number of characters constituting the PAN. In block 534, if the length of the PAN is less than twenty-eight characters, the PAN is padded (e.g., zeros or some other characters are added to the beginning or end of the PAN) to twenty-eight characters. In block 536, the twenty-eight character original or padded PAN is converted to a 56-byte binary value. In one exemplary implementation, a 16-bit Unicode Transformation Format (UTF-16) encoding may be employed to convert the PAN to the binary value. Once the PAN is thusly converted, in block 538 of FIG. 6 the original length of the PAN, the unique identifier for the payment information (e.g., time stamp), and the converted PAN are taken together as a payment information "package" for encryption. In one exemplary implementation, such a package is formatted as 64 bytes of binary data (e.g., in which the length of the PAN constitutes four bytes, the unique identifier constitutes four bytes, and the converted PAN constitutes 56 bytes).

In block 538 of FIG. 6, the tokenization system 145 facilitates encryption of the payment information package using a first key. As discussed further below, in one aspect of this embodiment this first key uniquely corresponds to the token 500 that is generated pursuant to the method 500 of FIG. 5. In another aspect, multiple different records of the token/PI database 150 are created and employed to separately and respectively store encrypted payment information and key information relating to the first key used for encryption.

In particular, for each instance of payment information 502 received by the tokenization system 145 for encryption and token generation, the tokenization system 145 creates and populates in the token/PI database 150 at least two different data records. For example, as indicated in block 540 of FIG. 6, encrypted payment information is stored in a first memory record of the token/PI database 150, together with the unique identifier associated with the payment information as well as a "token key identifier." The token key identifier stored in the first memory record identifies a second memory record of the token/PI database 150, different from the first memory record, in which key information relating to the first key is stored. As indicated in block 542 and discussed in greater detail below, the key information stored in the second memory record includes, amongst other things, a key label that identifies the first key (which in turn is stored elsewhere, e.g., in memory of the encryption/decryption system 147). In this manner, at least three different memory records are involved in the encryption of payment information and storage of relevant information relating to same, namely, first and second different memory records of the token/PI database 150, and a separate memory (e.g., of the encryption/decryption system 147) in which the first key used for encryption is stored. The multiple memory locations within a secure network at which relevant information is stored provides for secure and robust token generation and processing to recover payment information, without the need for employing encryption/decryption techniques to also generate the contents of a token and process same.

Figure 7:
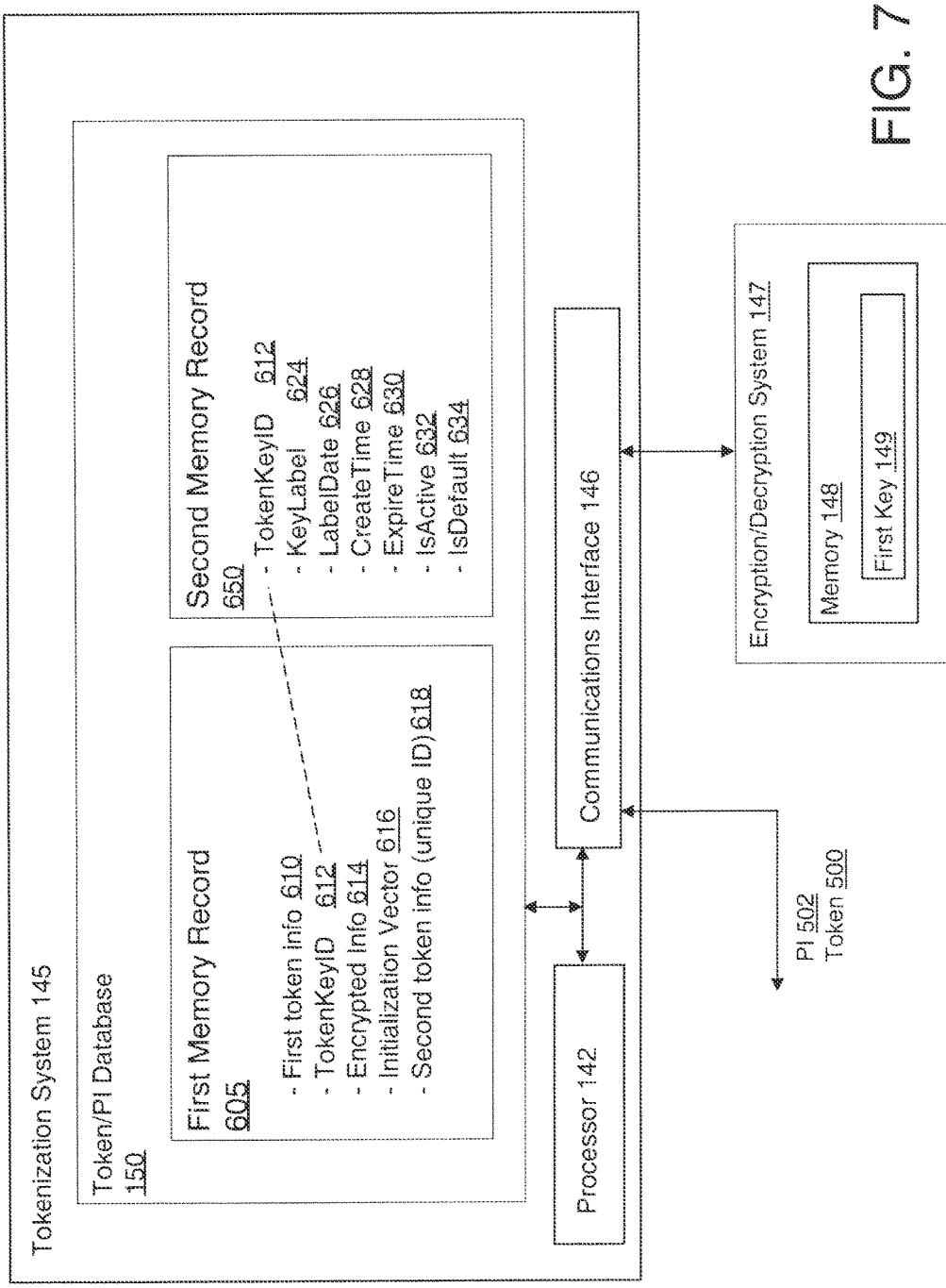
FIG. 7 illustrates a portion of the system of FIG. 1, showing the tokenization system, an encryption/decryption system, and respective memory records storing information relevant to encryption/decryption of sensitive information and generation/processing of tokens representing same, according to one embodiment of the present invention.

FIG. 7 illustrates a portion of the system of FIG. 1 showing additional details of the tokenization system 145, the encryption/decryption system 147, and the respective memory records storing information relevant to encryption/decryption of payment information and generation/processing of tokens, according to one embodiment of the present invention. FIG. 7 also shows other constituent elements of the tokenization system 145, including a processor 142 and a communications interface 146 for receiving/transmitting tokens 500 and payment information 502, as well as facilitating communications between the tokenization system 145 and the encryption/decryption system 147. The token/PI database 150 constitutes at least a portion of memory of the tokenization system 145, which memory is communicatively coupled to the processor 142. In exemplary implementations, in addition to the token/PI database 150, the memory of the tokenization system 145 may store processor-executable instructions (not shown explicitly in FIG. 7) that, when executed by the processor 142, implement various functionality discussed herein (e.g., in connection with the methods outlined in FIG. 5 and FIG. 6).

As shown in FIG. 7, the token/PI database 150 includes at least a first memory record 605 and a second memory record 650. As discussed above in connection with FIG. 5 and FIG. 6, the first memory record 605 includes entries respectively corresponding to: the first token information 610 (which, as noted in block 560 of FIG. 5 and discussed further below constitutes at least part of the token 500 itself); the token key identifier 612; the encrypted payment information 614; and the unique identifier 620 associated with the payment information (which, as noted above and also discussed further below may correspond to second token information constituting another part of the token 500 itself). The token key identifier 612 stored in the first memory record 605 serves as the link to the second memory record 650 (as indicated by the dashed line in FIG. 7).

The second memory record 650 of the token/PI database 150 shown in FIG. 7 also stores the token key identifier 612 (i.e., the link between the first and second memory records) as well as other key information relating to the first key used for encryption (and decryption). As also shown in FIG. 7, the first key itself, denoted with reference number 149, is stored in memory 148 of the encryption/decryption system 147. Examples of key information included in the second memory record 650 of the token/PI database 150 include, but are not limited to: a key label 624 that particularly identifies the first key 149, which is uniquely associated with the received payment information and used in the encryption (and decryption) process of same; a label date 626 (e.g., corresponding to the date that the first key 149 was generated); a create time 627 (e.g., corresponding toe the date and time that the second memory record 650 was created); an expire time 630 associated with the first key 149 (e.g., which indicates when the first key will expire and should be replaced/rotated); an "is active" indicator 632 (e.g., a flag that indicates that the present first key 149 is still valid to use); and an "is default" indicator 634 (e.g., a flag that indicates that the first key 149 is a default key to use for generating tokens).

In one embodiment, the encryption/decryption system 147 may employ an Advanced Encryption Standard (AES) that uses the first key 149 as well as an initialization vector to encrypt/decrypt the payment information. As known in the relevant arts, the AES is a symmetric-key encryption standard comprising three "block ciphers" each having a 128-bit block size, with key sizes of 128, 192 and 256 bits, respectively. An initialization vector is a block of bits that allows a block cipher to be executed to produce a unique stream independent from other streams produced by the same encryption key, without having to go through a re-keying process. As such, the initialization vector must be known to be able to decrypt encrypted information. Accordingly, in one aspect of the embodiment shown in FIG. 7, an initialization vector employed to encrypt the payment information is stored as an entry (i.e., initialization vector 616) in the first memory record 605 of the token/PI database 150, together with the encrypted information 614 and other entries in the first memory record.

Referring again to block 538 of FIG. 6, as well as the first and second memory records 605 and 650 of the of the token/PI database 150 shown in FIG. 7, to encrypt payment information (e.g., a converted PAN, a length of an original PAN, and unique identifier for the PAN), the tokenization system 145 transmits the payment information (e.g., via the communications interface 146) to the encryption/decryption system 147, and the encryption/decryption system employs the first key 149 and an initialization vector 614 to encrypt the payment information. The encryption/decryption system 147 in turn returns to the tokenization system 145 the encrypted payment information 614, the key label 624 for the first key 149 and the initialization vector 614. The tokenization system 145 creates the first memory record 605 and the second memory record 650 in the token/PI database 150; as noted above, the first token information 610 identifying the first memory record, the encrypted payment information 614, the initialization vector 616, the unique identifier 620 for the payment information, and the token key identifier 612 are stored in the first memory record, and the key information (including the key label 624), as well as the token key identifier 612, are stored in the second memory record. Again, the token key identifier 612 provides the link between the first and second memory records.

In some implementations the encryption/decryption system 147 may include a hardware security module (HSM) serving at least in part as the memory 148 on which the first key 149, as well as other keys used for encryption/decryption of various sensitive information such as payment information, are stored. Storing keys on an HSM facilitates periodic rotation of keys (PCI-DSS requires that encryption keys used to protect data be replaced on a regular, e.g., annual, basis). In the context of tokenization, the inventor has recognized and appreciated that key rotation presents significant implementation challenges using conventionally-generated tokens, e.g., tokens that are created using a random number generation process and/or encryption of the information contained in the token itself. With these conventional types of tokens, to implement key rotation the tokens themselves, as well as the sensitive information they represent, would both have to be periodically decrypted and re-encrypted, using respective new keys, in a coordinated manner.

The memory-based approach to token generation disclosed herein significantly mitigates some of the complexity that would otherwise be associated with key rotation in connection with conventional tokens having encrypted contents. For example, with reference again to FIG. 7, in one embodiment involving a key rotation protocol, a new key (a second key) may be generated to replace the first key 149, and a new (third) memory record similar to the second memory record 650 may be created in the token/PI database 150 to store key information associated with the second key. To facilitate re-encryption of the payment information using the second key without having to necessarily replace the token 500 representing same, the encrypted payment information 614 is read from the first memory record 605, decrypted using the first key 149, re-encrypted using the second key, and the first memory record 605 is then updated to replace the previously encrypted payment information with the re-encrypted payment information (which is placed in the same field/entry of the memory record). At the same time, the token key identifier 612 is updated to identify the new (third) memory record which contains key information relating to the second key. In this manner, respective payment information represented by corresponding tokens may be re-encrypted according to key rotation at any time without changing the tokens themselves, but rather merely changing the contents of the first memory record referenced by a given token to include updated re-encrypted payment information, and an updated token key identifier to identify the appropriate key information.

With respect to token generation, and with reference again to block 560 of the method 500 shown in FIG. 5, as noted above in one embodiment the tokenization system 145 generates a token 500 that includes memory-related information indicating the first memory record 605 shown in FIG. 7. In particular, the token 500 includes first token information 610 that also may be stored in the first memory record 605 as a label or pointer to same. In another embodiment, as also noted above, the token 500 further may include second token information representing the unique identifier associated with the payment information (e.g., see block 520 of FIG. 5), which in exemplary implementations may include a time stamp.

Figure 8:
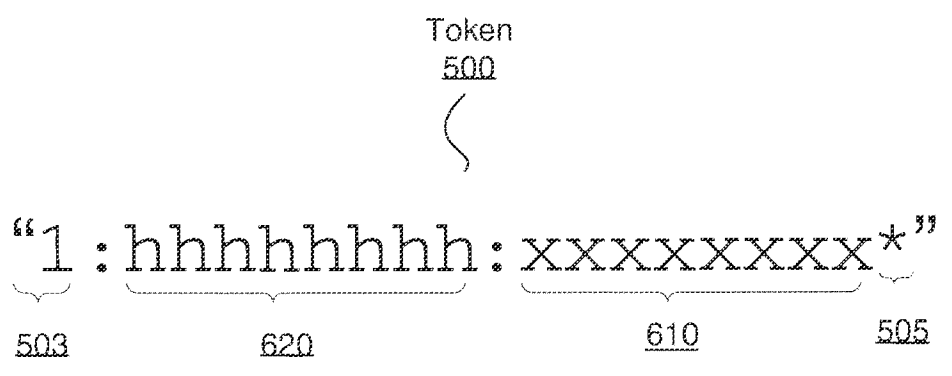

FIG. 8 illustrates an exemplary format for a token 500 generated by the tokenization system 145, according to one embodiment of the present invention. As illustrated in FIG. 8, the token may include respective fields for the first token information 610 and the second token information 620. In one aspect, each of the first token information 610 and the second token information 620 may be represented by an eight digit hexadecimal number. In another aspect, the token 500 may include third token information 503 representing a version of the token (e.g., a particular format used by the tokenization system 145 during a certain period of time). In yet another aspect, the token may include one or more delimiters (e.g., colons) to separate the respective information fields contained in the token (e.g., the first token information, the second token information, and the third token information, if present). Finally, the token 500 may include one or more additional fields 505 to provide for future use/expansion. In one exemplary implementation, only one character for the additional field 505 is employed (e.g., the trailing asterisk in FIG. 8), such that the token 500 is formatted as a twenty character string.

It should be appreciated that the particular format and content for the token 500 shown in FIG. 8 represents merely one illustrative embodiment, and that the inventive concepts disclosed herein may be implemented via tokens having different formats and content.

FIG. 9 is a flow diagram illustrating a method 900, employed by the tokenization system 145 of FIG. 1 and FIG. 7, for processing a token 500 and facilitating decryption of sensitive information, such as payment information, corresponding to the token, according to one embodiment of the present invention.

In block 910 of FIG. 9, the tokenization system 145 receives a token 500 (e.g., from the payment processor system 140 shown in FIG. 1) and parses the token to separate the first token information 610 identifying the first memory record 605 of the token/PI database 150 and the second token information 620 representing the unique identifier for the payment information. Based on the first token information 610, in block 920 the tokenization system 145 reads from the first memory record the encrypted payment information 614, the initialization vector 616, and the token key identifier 612. In block 930, based on the token key identifier 612 that identifies the second memory record 650, the tokenization system reads from the second memory record the key label 624 that identifies the first key 149 used to encrypt the encrypted payment information 614 (and that uniquely corresponds to the token 500). In block 950, the tokenization system transmits (e.g., via the communications interface 146) the encrypted payment information 614, the initialization vector 616, and the key label 624 to the encryption/decryption system 147, which decrypts the encrypted payment information based on the first key 149. As discussed above, in some exemplary implementations the encryption/decryption system 147 may include an HSM constituting at least part of the memory in which the first key 149 is stored (which is accessed based on the key label 624), and may employ an Advanced Encryption Standard (AES) for the decryption.

In block 960 of FIG. 9, the encryption/decryption system 147 returns to the tokenization system the recovered payment information, which as discussed above in connection with FIG. 6 may include the PAN associated with the PCI card, a length of the PAN, and the unique identifier associated with the payment information as received prior to encryption. Based at least in part on the extracted unique identifier following decryption, the tokenization system 145 may validate the token (e.g., ensure the token's integrity, authenticity, and/or freshness) by comparing the extracted unique identifier to the second token information 620. Alternatively, the tokenization system may compare the second token information to the unique identifier stored in the first memory record (prior to encryption) as one of the respective entries of the first memory record. If the comparison results in a match, the token is thereby validated and the tokenization system 145 accordingly transmits the recovered payment information to the payment processing system 140 to effect payment.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented using hardware, software or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for generating a token to identify payment information relating to a purchase of a product and/or service from a vendor, the method comprising:
   receiving the payment information, by a communications interface of a device, from a billing service acting as a billing agent of the vendor;
   identifying, by a tokenization system executed by a processor of the device, a first memory address of a first record of a token database;
   generating, by the tokenization system, a unique identifier comprising a timestamp;
   determining, by the tokenization system from the received payment information, a length of a primary account number (PAN) of an account used to purchase the product and/or service from the vendor;
   aggregating, by the tokenization system, the PAN and the length of the PAN and the unique identifier into an aggregated record;
   encrypting, by the tokenization system, the aggregated record using an encryption key to generate an encrypted record;
   generating, by the tokenization system, a token key identifier that identifies a second memory address of a second record of the token database, different from the first record;
   storing the encrypted record, the token key identifier, and the unique identifier, by the tokenization system, in the first record of the token database at the first memory address;
   storing, by the tokenization system in the second record of the token database at the second memory address, an identification of the encryption key;

transmitting, by the communication interface, a token comprising the first memory address and the timestamp to the vendor;

subsequently receiving, by the communication interface from a payment processing system, the token;

extracting, by the tokenization system, the first memory address and the unique identifier from the token;

retrieving, by the tokenization system from the first memory address, the token key identifier identifying the second memory address;

retrieving, by the tokenization system from the second memory address, the identification of the encryption key;

decrypting, by the tokenization system, the aggregated record with the encryption key;

extracting, by the tokenization system, the unique identifier from the aggregated record;

determining, by the tokenization system, that the unique identifier extracted from the aggregated record matches the unique identifier extracted from the token; and responsive to the determination, transmitting, by the communication interface, the PAN to the payment processing system, the PAN extracted from the aggregated record.

2. The method of claim 1, wherein the token is generated without generating a random number.

3. The method of claim 1, wherein the token further comprises token information representing a version of the token.

4. The method of claim 1, further comprising determining, by the tokenization system, that the length of the PAN is less than a predetermined length, and padding the PAN to the predetermined length responsive to the determination that the length of the PAN is less than the predetermined length.

5. A system, comprising:

a device comprising a processor, a communication interface, and a memory storing a token database and computer executable instructions that, when executed by the processor, cause the processor to perform operations of:

receiving, via the communication interface from a billing service acting as a billing agent of a vendor, payment information relating to a purchase of a product and/or service from the vendor, identifying a first memory address of a first record of the token database, generating a unique identifier comprising a timestamp, determining, from the received payment information, a length of a primary account number (PAN) of an account used to purchase the product and/or service from the vendor, aggregating the PAN and the length of the PAN and the unique identifier into an aggregated record, encrypting, the aggregated record using an encryption key to generate an encrypted record, generating a token key identifier that identifies a second memory address of a second record of the token database, different from the first record, storing the encrypted record, the token key identifier, and the unique identifier in the first record of the token database at the first memory address, storing, in the second record of the token database at the second memory address, an identification of the encryption key, transmitting, via the communication interface, a token comprising the first memory address and the timestamp to the vendor, subsequently receiving, via the communication interface from a payment processing system, the token, extracting the first memory address and the unique identifier from the token, retrieving, from the first memory address, the token key identifier identifying the second memory address, retrieving, from the second memory address, the identification of the encryption key, decrypting the aggregated record with the encryption key, extracting the unique identifier from the aggregated record, determining that the unique identifier extracted from the aggregated record matches the unique identifier extracted from the token, and responsive to the determination, transmitting, via the communication interface, the PAN to the payment processing system, the PAN extracted from the aggregated record.

6. The system of claim 5, wherein the token is generated without generating a random number.

7. The system of claim 5, wherein the token further comprises token information representing a version of the token.

8. The system of claim 5, wherein the operation further comprises determining that the length of the PAN is less than a predetermined length, and padding the PAN to the predetermined length responsive to the determination that the length of the PAN is less than the predetermined length.

* * * * *